United States Patent
Zhao

(10) Patent No.: US 10,444,550 B1
(45) Date of Patent: Oct. 15, 2019

(54) ELECTRO-OPTICAL MATERIAL MOUNTING CONFIGURATION FOR HIGH SPEED OPERATION

(71) Applicant: Jing Zhao, Woburn, MA (US)

(72) Inventor: Jing Zhao, Woburn, MA (US)

(73) Assignee: Agiltron, Inc., Woburn, MA (US)

(*) Notice: Subject to any disclaimer, the term of this patent is extended or adjusted under 35 U.S.C. 154(b) by 221 days.

(21) Appl. No.: 15/633,088

(22) Filed: Jun. 26, 2017

(51) Int. Cl.
*G02F 1/01* (2006.01)
*C01G 33/00* (2006.01)
*C01G 35/00* (2006.01)
*G02F 1/00* (2006.01)

(52) U.S. Cl.
CPC .......... *G02F 1/0018* (2013.01); *C01G 33/00* (2013.01); *C01G 35/00* (2013.01)

(58) Field of Classification Search
None
See application file for complete search history.

(56) References Cited

U.S. PATENT DOCUMENTS

| | | | | |
|---|---|---|---|---|
| 3,985,952 | A * | 10/1976 | Adler | G02F 1/0128 369/44.13 |
| 5,261,202 | A * | 11/1993 | Brunet | B64D 43/00 52/202 |
| 6,137,619 | A * | 10/2000 | Chen | G02F 1/055 359/245 |
| 8,588,261 | B2 * | 11/2013 | Caird | H01S 3/005 252/582 |
| 2009/0040409 | A1 * | 2/2009 | Ono | G02F 1/134363 349/39 |
| 2010/0315621 | A1 * | 12/2010 | Sasaki | G01C 19/721 356/73.1 |
| 2018/0275481 | A1 * | 9/2018 | Shinozaki | G02F 1/2255 |

* cited by examiner

*Primary Examiner* — John J Figueroa
(74) *Attorney, Agent, or Firm* — Shifrin Patent Law; Dan Shifrin

(57) ABSTRACT

An optical device is provided for electrically changing light beam properties, comprising an electro-optical (EO) material positioned in a light beam path, a metal plate to which the EO material is attached, and a first soft metal layer attached to at least to the first surface of the EO material. A method is also provided for dampening resonant vibration in an EO material, comprising forming a bar from an EO material, providing a metal plate, and soldering a first surface of the EO bar to a surface of the metal plate with a soft metal alloy.

7 Claims, 2 Drawing Sheets

A

B

ELECTRO-OPTICAL MATERIAL MOUNTING CONFIGURATION FOR HIGH SPEED OPERATION

TECHNICAL FIELD

The present invention relates generally to electrical and optical devices such as switches, variable splitters, variable attenuators, frequency shifters and other devices in which an electro-optical material is incorporated and, in particular, to an electro-optical material mounting configuration that enables the device to be operated at high speed without distortions.

BACKGROUND ART

Electrically controlled optic devices direct optical signals along selected fibers, or control optical signal intensity within a fiber link, or select a wavelength band of an optic network in which light signals are transmitted along optical fibers to transfer information from one location to another. Optical devices of this type should have the following performance characteristics: high-speed operation, low optical insertion loss, high reliability, low power consumption, easy to drive, and low cost to produce. Electrically controllable optical devices are becoming increasingly important in today's optical networks, due to their dynamically reconfigurable advantages.

In order to make the electro-optical device more efficient with smaller size and lower driving voltage, it is preferred to employ an electro-optical material as thin as possible. An application example is described in U.S. Pat. No. 7,403,677, by Zhao et al. This configuration can also be utilized in modulating a laser beam. However, the piezo-electric effect of electro-optic materials can generate unwanted vibrations when operated at high frequency. This vibration distorts the laser beam and consequently limits the operation frequency of the electro-optic devices.

SUMMARY OF THE INVENTION

Embodiments of the present invention provide an optical device and a method to dampen the resonant mechanical vibrations in electro-optical material induced by electrically driving it at high speed. The results are cost effective fiberoptic devices with a fast response time.

Embodiments of the optical device comprise an electro-optical (EO) material positioned in a light beam path, a metal plate to which the EO material is attached, and a first soft metal layer attached to at least to the first surface of the EO material.

Embodiments of the method comprise forming a bar from an EO material, providing a metal plate, and soldering a first surface of the EO bar to a surface of the metal plate with a soft metal alloy.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
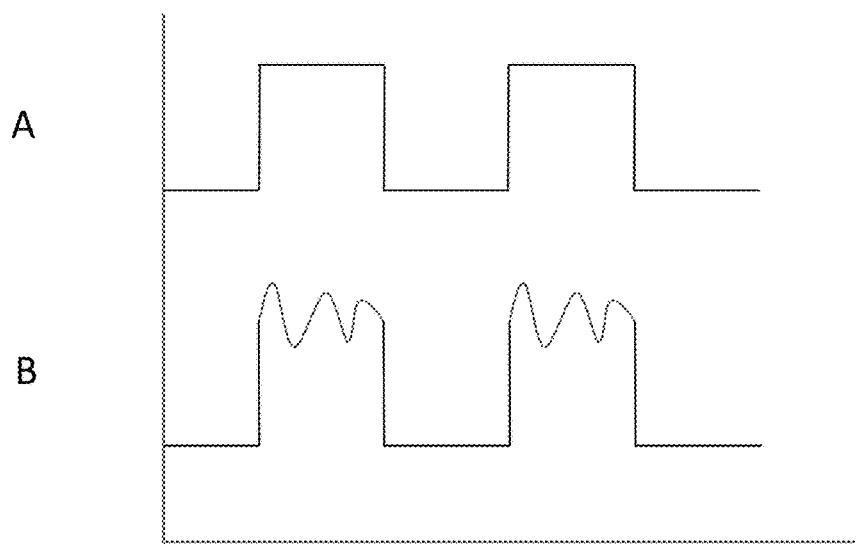
FIG. 1 illustrates an optical response of a prior art electro-optic (EO) device driving at high speed.

Although, high-speed reconfigurable fiberoptic devices have response time significantly less than a microsecond and a low driving voltage, their high-speed performance may suffered from noise created by mechanical vibrations of the electro-optic (EO) material. EO materials are subject to a piezo-electric effect in which the material expands or contracts when a voltage is applied. The displacement due to piezo-electric effect is normally very small. However, when a high-frequency oscillation or fast pulse voltage is applied to an EO material, mechanical resonances can be excited. Mechanical resonance is the tendency of a mechanical system to respond at much greater amplitude when the frequency of its oscillations matches the system's natural frequency of vibration. This pronounced resonant vibration degrades the EO device performance by distorting the signal with extra modulation peaks. This is shown in FIG. 1. In which curve A is an electrical driving signal and curve B is the corresponding optical modulation. The extra peaks illustrated in curve B are generated by the EO material resonant vibration.

Embodiments of the present invention provide practical high-speed fiberoptic reconfigurable devices, such as optical switches, variable splitters, optical wavelength selectors, and variable attenuators that can be efficiently coupled to optical fibers with low loss and require only low driving voltages.

Figure 2:
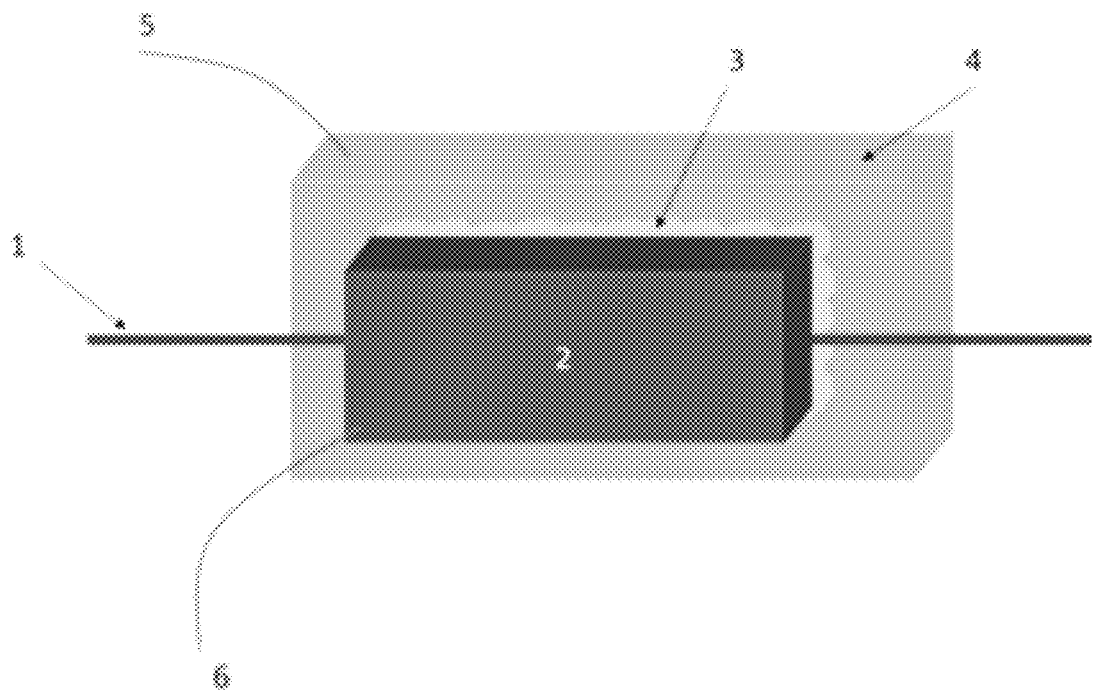
FIG. 2 illustrates an embodiment of an EO device in accordance with the invention.
Figure 3:
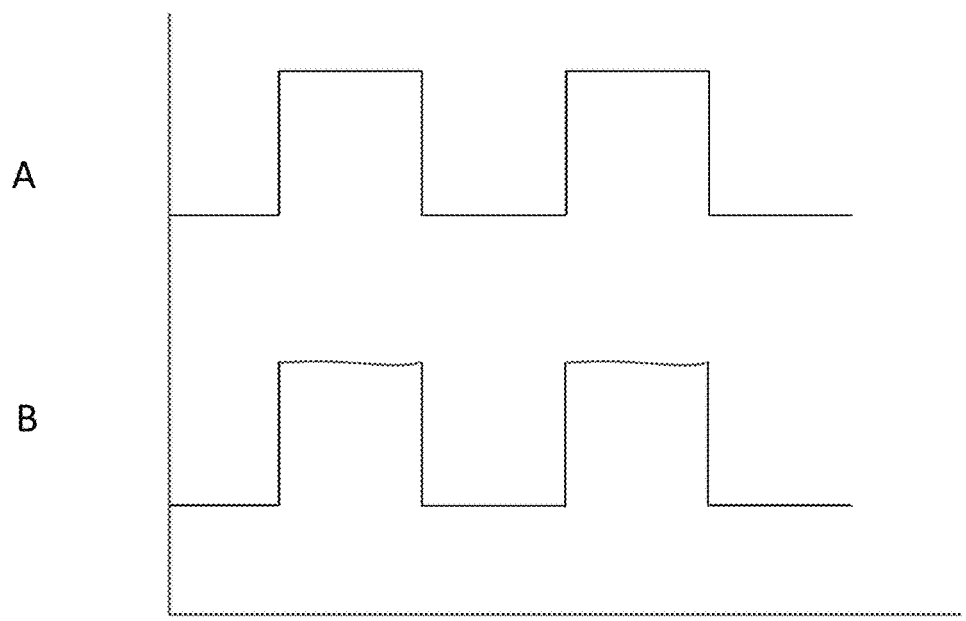
FIG. 3 illustrates an optical response of the EO device of FIG. 2 driven at high speed.

Embodiments of the present invention substantially or completely dampen the effect of EO material resonant vibration. As shown in FIG. 2, the bottom surface of EO material bar 2 is attached to a metal plate 4 with a layer of soft metal soldering alloy 3 in between. The soft soldering alloy 3 may contain indium, gallium, lead, mercury, or other metal with like properties, including being soft at ambient temperature. Electrode 5 is soldered onto a surface of the metal plate 4 and electrode 6 is soldered to a side of the EO bar 2, both perpendicular to the direction of a light beam 1 propagation launched through the EO material 2. The resulting EO modulation in response to a fast driving signal is shown in FIG. 3 in which curve A is the electrical driving signal and curve B is the corresponding optical modulation.

The EO material 2 may be formed from any appropriate EO crystal such as, by way of example only, lithium niobate ($LiNbO_3$); potassium titanyl phosphate (KTP); lithium tantalite ($LiTaO_3$); rubidium titanyl phosphate ($RbTiOPO_4$ or RTP); potassium dihydrogen phosphate ($KH_2PO_4$ or KDP); deuterated potassium dihydrogen phosphate ($KD_2PO_4$ or KD*P); barium borate (BBO); potassium niobate ($KnbO_3$); and KTN ($KTa_xNb1-xO_3$). The EO material 2 may also be formed from any appropriate bulk material such as, by way of example only, lead niobate zirconate (PNZ); lead lanthanum zirconate titanate (PLZT); lead magnesium niobate (PMN); and lead magnesium niobate-lead titanate (PMN-PT).

In comparison with FIG. 1, the EO configuration of the present invention substantially reduces or eliminates resonant effects in which the resonant vibration is substantially absorbed by the soft metal alloy 3. The metal alloy 3 also has less stress when bonding to the EO material. Additionally, the use of soft metal solder 3 on the larger piece of hard metal 4 tends to conduct away residual sound waves that cannot be fully absorbed by the soft metal solder layer 3. Furthermore, the soft metal 3 is wettable to the EO 2 surface, consequently can be directly soldered to the surface of the EO 2 to form the absorption layer as well as the electrodes. This process advantageously eliminates the need for the connectional electrode fabrication process that requires vacuum deposition which increase production cost and reduce device reliability due to poor bonding property.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dampening resonant vibration in an electro-optical (EO) material, comprising:
    forming a bar from an EO material;
    providing a sound wave conducting metal plate; and
    soldering a first surface of the EO bar to a surface of the metal plate with a soft metal alloy.

2. The method of claim 1, wherein the soft metal alloy is selected from the group consisting of gallium, lead, mercury, and indium.

3. The method of claim 1, wherein:
    the first soft metal alloy is a wettable to the EO bar; and
    the first surface of the bar is soldered to the metal plate without flux or metallization of the first surface of the EO bar.

4. The method of claim 1, further comprising:
    soldering a first electrode to a side of the metal plate with the soft metal alloy and oriented perpendicular to a light beam path through the EO bar; and
    soldering a second electrode to a second surface of the EO bar oriented perpendicular to a light beam path through the EO bar.

5. The method of claim 1, further comprising attaching the soft metal alloy to a second side of the EO bar.

6. The method of claim 1, wherein the step of forming the EO bar comprises forming the EO bar from an EO crystal selected from the group consisting of $LiNbO_3$, KTP, $LiTaO_3$, RTP, KDP, KD*P, BBO, $KnbO_3$, and $KTa_xNb_{1-x}O_3$.

7. The method of claim 1, wherein the step of forming the EO bar comprises forming the EO bar from a bulk material selected from the group consisting of PNZ, PLZT, PMN, and PMN-PT.

* * * * *